United States Patent
Wang et al.

(10) Patent No.: US 8,570,918 B2
(45) Date of Patent: Oct. 29, 2013

(54) SYSTEM AND METHOD FOR PROCESSING A FREQUENCY DIVISION MULTIPLEXING SIGNAL

(75) Inventors: Hai-wei Wang, Hsinchu (TW); David W. Lin, Hsinchu (TW); Tzu-Hsien Sang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 168 days.

(21) Appl. No.: 13/106,681

(22) Filed: May 12, 2011

(65) Prior Publication Data

US 2012/0120970 A1 May 17, 2012

(30) Foreign Application Priority Data

Nov. 15, 2010 (TW) .............................. 99139252 A

(51) Int. Cl.
- H04L 5/14 (2006.01)
- H04B 7/208 (2006.01)
- H04J 1/00 (2006.01)

(52) U.S. Cl.
USPC ............................ 370/295; 370/344; 370/480

(58) Field of Classification Search
USPC .......................... 370/295, 343, 344, 430, 480
See application file for complete search history.

(56) References Cited

U.S. PATENT DOCUMENTS

| | | | | |
|---|---|---|---|---|
| 6,801,569 B1* | 10/2004 | Yang | .............................. | 375/152 |
| 2002/0146063 A1* | 10/2002 | Gorokhov et al. | ............ | 375/148 |
| 2009/0003416 A1* | 1/2009 | Yu et al. | ......................... | 375/148 |
| 2010/0080178 A1* | 4/2010 | Cox et al. | ....................... | 370/329 |
| 2011/0268019 A1* | 11/2011 | Tang et al. | ..................... | 370/328 |

OTHER PUBLICATIONS

Won Gi Jeon et al.: "An Equalization Technique for Orthogonal Frequency-Division Multiplexing Systems in Time-Variant Multipath Channels", IEEE Transactions on Communications, vol. 47, No. 1, pp. 27-32, Jan. 1999.

Philip Schniter: "Low-Complexity Equalization of OFDM in Doubly Selective Channels", IEEE Transactions on Signal Processing, vol. 52, No. 4, pp. 1002-1011, Apr. 2004.

Luca Rugini et al.: "Simple Equalization of Time-Varying Channels for OFDM", IEEE Communication Letters, vol. 9, No. 7, pp. 619-621, Jul. 2005.

Shuichi Ohno: "Maximum Likelihood Inter-Carrier Interference Suppression for Wireless OFDM with Null Subcarriers", Proceedings of IEEE International Conference on Acoustics, Speech, and Signal Processing, Mar. 2005, vol. III, pp. 849-852.

\* cited by examiner

*Primary Examiner* — Kerri Rose

(57) ABSTRACT

A method for processing a frequency division multiplexing signal transmitted in a channel is provided. The method includes the steps of a) receiving the frequency division multiplexing signal having a residual intercarrier interference (ICI) and a channel noise and transmitted by plural subcarriers; b) performing a cyclic prefix removal and a discrete Fourier transform for the frequency division multiplexing signal to obtain a frequency-domain signal; c) analyzing the frequency-domain signal to obtain a plurality of correlation values for the residual ICI and the channel noise; and d) performing a communication signal processing for the frequency division multiplexing signal based on at least one of the plural correlation values.

16 Claims, 6 Drawing Sheets

SYSTEM AND METHOD FOR PROCESSING A FREQUENCY DIVISION MULTIPLEXING SIGNAL

CROSS REFERENCE TO RELATED APPLICATIONS

The application claims the benefit of Taiwan Patent Application No. 099139252, filed on Nov. 15, 2010, at the Taiwan Intellectual Property Office, the disclosures of which are incorporated herein in their entirety by reference.

FIELD OF THE INVENTION

The present invention relates to a system and a method for processing a signal, especially to a system and a method for processing a frequency division multiplexing signal.

BACKGROUND OF THE INVENTION

Please refer to FIG. 1, which is the block diagram showing a discrete-time baseband equivalent model of the orthogonal frequency division multiplexing (OFDM) system 10 in the prior art. The orthogonal frequency division multiplexing system 10 includes a transmitter 12, a transmission channel 13 and a receiver 14. The transmitter 12 receives a transmitter input signal I1, and generates a transmitted time-domain signal S21 in response to the transmitter input signal I1. The transmitted time-domain signal S21 is referred to in this invention also as a frequency division multiplexing signal or a frequency division multiplexing time-domain signal. The transmitter 12 includes a signal generator 121 and a processing unit 122. The processing unit 122 includes an inverse discrete Fourier transforming (IDFT) unit 122RT and a cyclic prefix (CP) adding unit 122A. The receiver 14 includes a signal detecting unit 141 and a processing unit 142. The processing unit 142 includes a cyclic prefix (CP) removing unit 142D and a discrete Fourier transforming (DFT) unit 142T. The processing unit 122 is coupled to the signal generator 121 and generates the transmitted time-domain signal S21 in response to the transmitter input signal I1. The transmission channel 13 outputs a received time-domain signal S22 in response to transmitted time-domain signal S21. The received time-domain signal S22 is also referred to in this invention as a frequency division multiplexing signal or a frequency division multiplexing time-domain signal. The receiver 14 receives the received time-domain signal S22, and generates a receiver output signal O1. The processing unit 142 is coupled to the transmission channel 13, receives the received time-domain signal S22, and generates a receiver frequency-domain signal S3 in response to the received time-domain signal S22.

The transmitter input signal I1 is input to the transmitter 12, and the transmitter frequency-domain signal S1 of the frequency division multiplexing property is generated from passing the transmitter input signal I1 through the signal generator 121. The transmitted time-domain signal S21 is generated by passing the transmitter frequency-domain signal S1 through the inverse discrete Fourier transforming (IDFT) unit 122RT and the cyclic prefix (CP) adding unit 122A successively. The received time-domain signal S22 is obtained by passing the transmitted time-domain signal S21 through the transmission channel 13. The received time-domain signal S22 is input to the receiver 14. The receiver frequency-domain signal S3 is generated by passing the received time-domain signal S22 of the frequency division multiplexing property by the cyclic prefix (CP) removing unit 142D and the discrete Fourier transforming (DFT) unit 142T successively. The receiver frequency-domain signal S3 is sent to the signal detecting unit 141 for signal processing. The receiver frequency-domain signal S3 includes three components: a main signal S4, a residual intercarrier interference (ICI) S5 and a channel noise S6. The receiver frequency-domain signal S3 is detected by the signal detecting unit 141 using a signal detection method. The signal detection method can employ the methods of least squares, minimum mean square error, iterative minimum mean square error, decision feedback equalization, and maximum likelihood sequence estimation (MLSE).

For instance, carrier frequency shift and channel time-variation can result in ICI and degradation of the signal transmission performance in an orthogonal frequency division multiplexing (OFDM) communication system. The problem becomes especially serious when the carrier frequency is very high or when the user terminal moves at a fast speed. The problem can be understood by observing the mathematical relationship concerning the transmitter and the receiver in an OFDM system.

Let N be the size of the discrete Fourier transform (DFT) in the system. Then the relation between the transmitted signal and the received signal in an OFDM symbol interval can be expressed as in the following equation (1):

$$y = Hx + w \quad (1)$$

wherein x is the N-vector of the transmitter signal samples in the frequency domain (S1), y is the N-vector of the receiver signal samples in the frequency domain (S3), H is the N×N channel matrix in the frequency domain, and w is the N-vector of the noise samples in the frequency domain (S6).

The channel matrix H is a diagonal matrix when there is no ICI. When there is ICI, non-zero values may appear not only along the diagonal but also in other locations of the matrix. This condition causes difficulty in detection of ODFM signals.

Theoretically, the best signal detector should consider all ICI terms. However, due to complexity and robustness concerns, usually only the main terms in the channel matrix H will be compensated. Since the main terms usually appear around the diagonal of the channel matrix H, a band structure shows up in the channel matrix H.

Please refer to the paper by Won Gi Jeon, Kyung Hi Chang and Yong Soo Cho, "An Equalization Technique for Orthogonal Frequency division Multiplexing Systems in Time-Varian Multipath Channels", IEEE Transactions on Communications, Vol. 47, No. 1, pp. 27-32, January 1999. In this paper, normalized maximum Doppler frequencies on the order of 0.1 or less are considered, under which condition the channel variation over a short time period can be assumed to be linear, and a frequency-domain equalizer corresponding to the band structure of the channel matrix is proposed. In another paper by Philip Schniter, "Low-Complexity Equalization of OFDM in Doubly Selective Channels", IEEE Transactions on Signal Processing, Vol. 52, No. 4, pp. 1002-1011, April 2004, normalized maximum Doppler frequencies up to the order of magnitude of 1 are considered, under which condition the ICI is more widely spread in the frequency domain, a time-domain window is recommended to partially cancel the effect of the channel time-variation and reduce the bandwidth of the channel matrix, and an iterative least squares error method is used to detect the signal. In the paper by Luca Rugini, Paolo Banelli and Geert Leus, "Simple Equalization of Time-Varying Channels for OFDM", IEEE Communication Letters, Vol. 9, No. 7, pp. 619-621, July 2005, a block-type linear minimum mean square error equalizer is proposed to deal with the ICI, wherein the band channel matrix structure and triangular factorization of the channel autocorrelation matrix are used to reduce the equalizer complexity. In the paper by Shuichi Ohno, "Maximum Likelihood Inter-carrier Interference Suppression for Wireless OFDM with Null Subcarriers", Proceedings of IEEE International Conference on Acoustics, Speech, and Signal Processing, March 2005, Vol. III, pp. 849-852, Viterbi MLSE in the frequency domain is used to deal with the ICI, and the band channel matrix structure is utilized to limit the algorithm complexity.

However, in these prior-art signal detection methods only a few main ICI terms are considered and the whole channel matrix H is approximated using these main ICI terms, which result in an irreducible floor in the bit error rate (BER) in a time-varying channel. On the other hand, if more ICI terms in the channel matrix are considered, then the transceiver complexity will increase. Therefore, a technology that can improve the signal transmission and reception performance of communication systems at a low complexity in needed.

SUMMARY OF THE INVENTION

In order to solve the above mentioned problems, the present invention provides a system and a method for processing a frequency division multiplexing signal. This invention improves the signal transmission and reception performance by reducing the ICI, and it can be applied with many existing signal detection methods. It can be used in communication systems that make use of the time-frequency transform concept, such as OFDM, single-carrier frequency division multiple access (SC-FDMA), etc.

Take the OFDM system for example. The received signal in the OFDM frequency domain (S3) can be expressed as in the following equation (2):

$$Y_m = \sum_{k=0}^{N-1} \sum_{l=0}^{L-1} X_k H_l^{(m-k)} e^{-j2\pi lk/N} + W_m, \quad 0 \le m \le N-1, \quad (2)$$

where when ICI exists, the received signal sample $Y_m$ at each subcarrier includes a weighted linear combination of the signal samples $X_k$, with k running from 0 to N−1, and signal samples $X_k$ are the transmitter signals on the subcarriers (S1). Existing methods for countering the ICI only consider a limited number of terms in the weighted linear combination, resulting in an irreducible floor in the BER.

The present invention makes better use of band approximation wherein it divides the signal containing the ICI into three components, namely, a main signal, a residual ICI and a channel noise. By way of mathematical approximation, theoretical derivation and channel simulation, it is observed that the residual ICI in nearby subcarriers has high normalized statistical correlation. Especially, based on this statistical property the residual ICI terms conventionally disregarded due to receiver complexity concerns can be fully considered in the present invention. Moreover, it is found in the present invention that the normalized correlations of the residual ICI in nearby subcarriers remain almost constant under all practical system parameters. These system parameters include maximum Doppler frequency shift, multipath channel profile, Doppler power spectral density, sampling period of OFDM system, DFT size, symbol period of OFDM system and average transmitted symbol energy. It can thus be concluded from the above discovery that the high normalized correlation of residual ICI in nearby subcarriers and its ease of estimation are very suitable for application in signal reception in a practical communication system.

By utilizing these statistical characteristics, a very low noise floor can be obtained in a receiver by a whitening operation on the residual ICI and the channel noise, yielding an excellent transmission performance for the communication system. For example, computer simulation shows that the error floor in BER can be reduced by several orders in magnitude for a receiver employing maximum likelihood sequence estimation (MLSE) with the whitening operation on residual ICI in nearby subcarriers. Thus, it can be clearly seen that the utilization of the statistical characteristics in combination with the conventional receiver detection methods can significantly enhance the receiving performance of a communication system. In addition, the transmission performance of a communication system can also be enhanced by having the receiver estimate a channel information parameter pertaining to the condition after the whitening operation, feed the channel information parameter back to a transmitter through a closed loop transmission control mechanism, and let the transmitter adapt its transmission scheme taking into account the channel information parameter pertaining to the condition after the whitening operation. Furthermore, in a communication system that employs channel sounding, the abovementioned channel information parameter can be estimated by the transmitter after receiving the sounding signal, without having the receiver feed it back.

In accordance with one aspect of the present invention, a method for processing a frequency division multiplexing signal transmitted in a channel is provided. The method includes the steps of a) receiving the frequency division multiplexing signal having a residual intercarrier interference (ICI) and a channel noise on a subcarrier wherein the residual ICI may be due to channel time-variation or carrier frequency shift; b) performing a cyclic prefix removal and a discrete Fourier transform (DFT) on the frequency division multiplexing signal to obtain a frequency-domain signal; c) analyzing the frequency-domain signal to obtain a plurality of correlation values for the residual ICI and the channel noise; and d) performing a communication signal processing for the frequency division multiplexing signal based on the plurality of correlation values.

In accordance with another aspect of the present invention, a frequency division multiplexing communication system is provided, wherein there is a channel and a receiver, with the channel used to transmit a frequency division multiplexing signal. The signal on a subcarrier of the frequency division multiplexing system contains a residual intercarrier interference (ICI) and a channel noise. The receiver acquires a frequency-domain signal from the frequency division multiplexing signal and performs communication signal processing on the frequency division multiplexing signal to enhance the communication performance employing a plurality of correlation values of the residual ICI and the channel noise in the frequency-domain signal.

The above objects and advantages of the present invention will become more readily apparent to those ordinarily skilled in the art after reviewing the following detailed descriptions and accompanying drawings, in which:

Figure 2A:
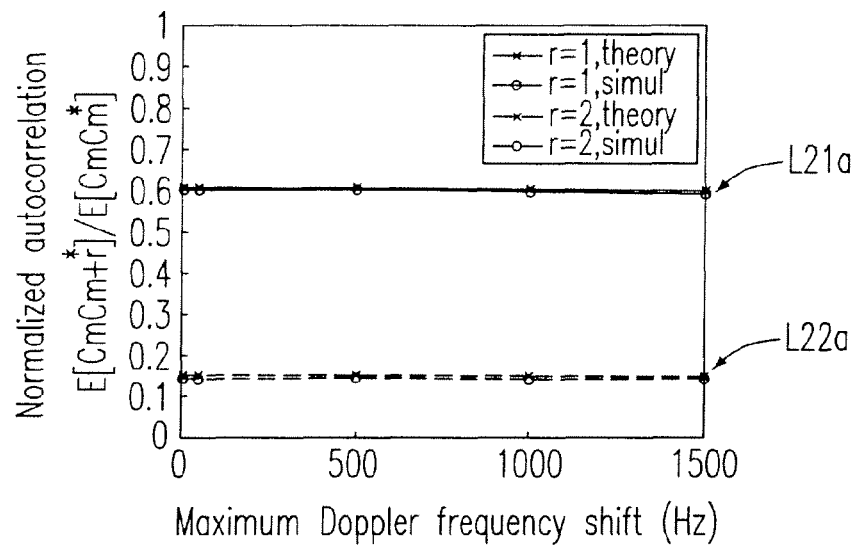
FIGS. 2A-2C are diagrams showing the normalized autocorrelation function $$\frac{E[c_m c_{m+r}^*]}{E[|c_m|^2]}$$
Figure 2B:
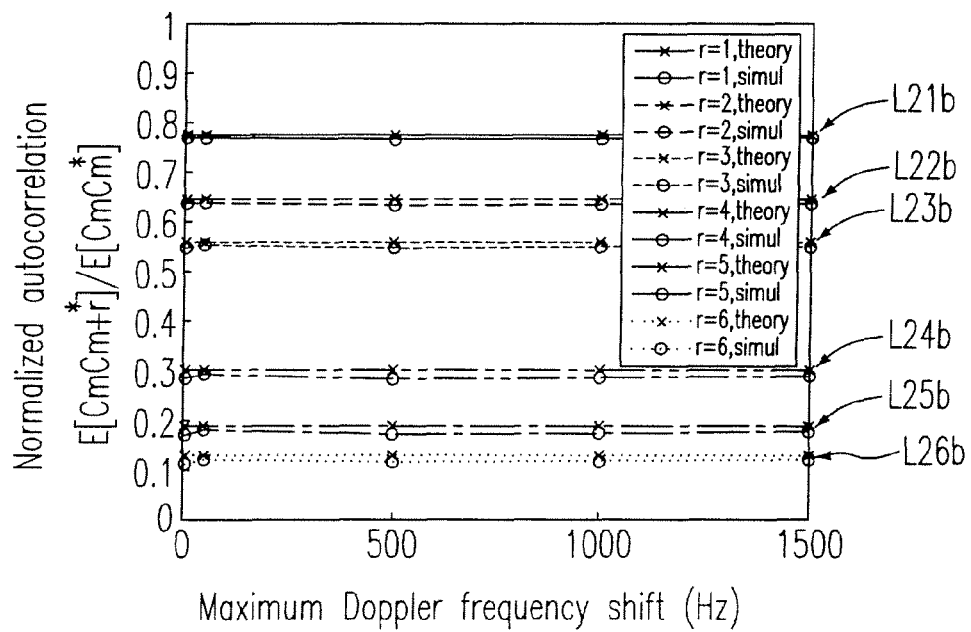
Figure 2C:
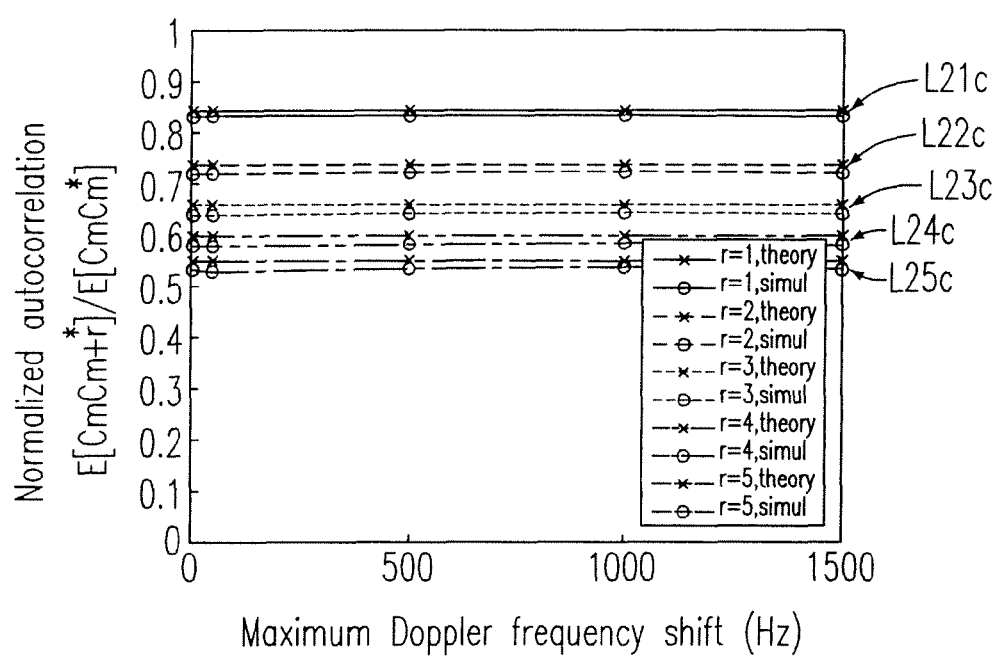
Figure 3:
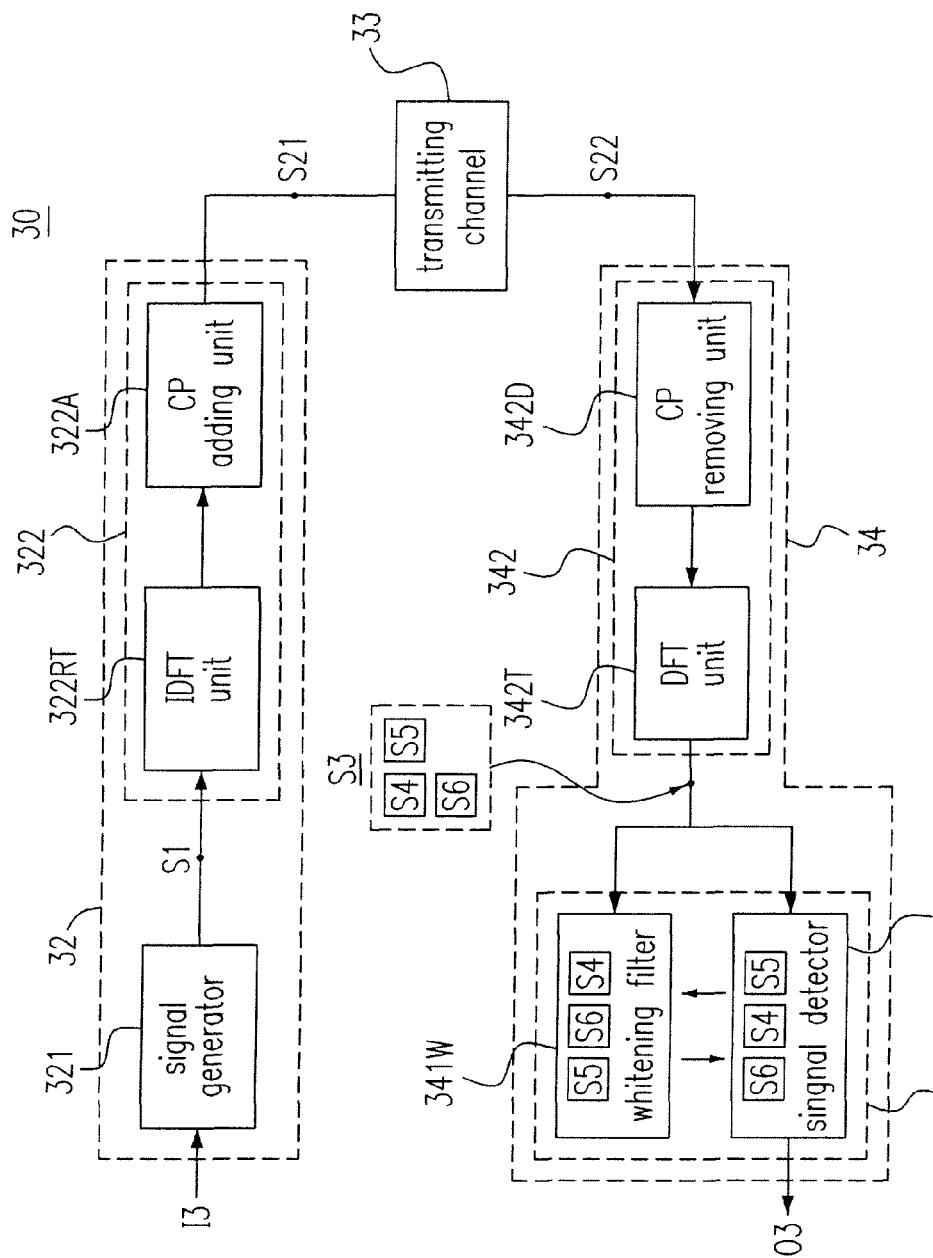
Figure 4A:
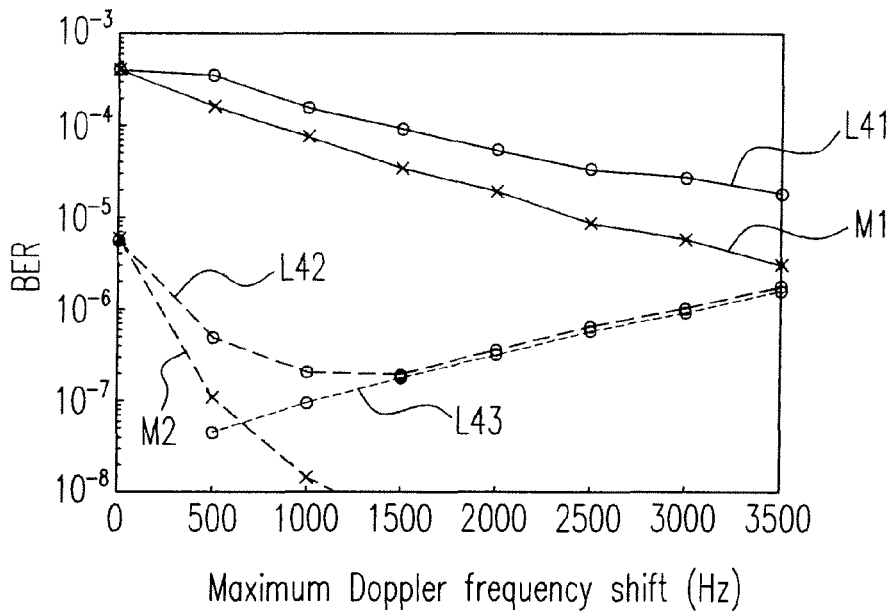
Figure 4B:
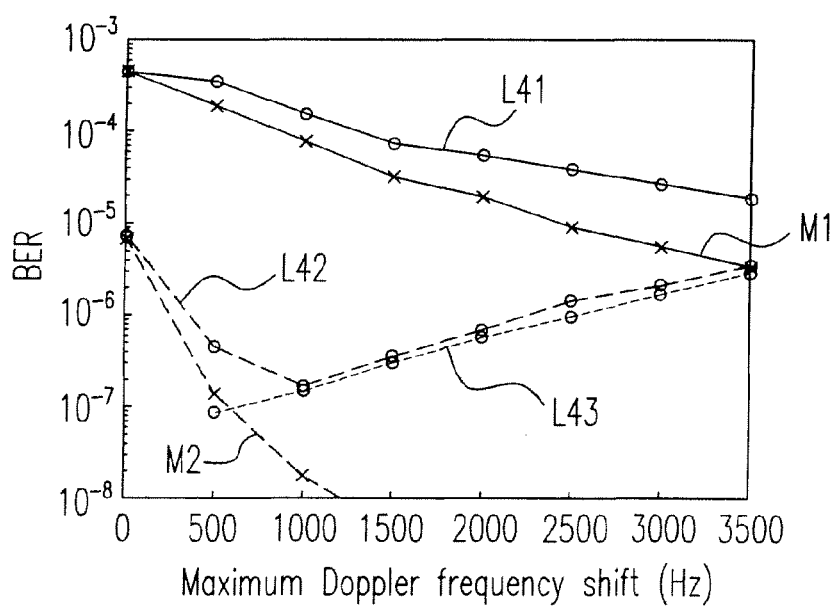
Figure 5A:
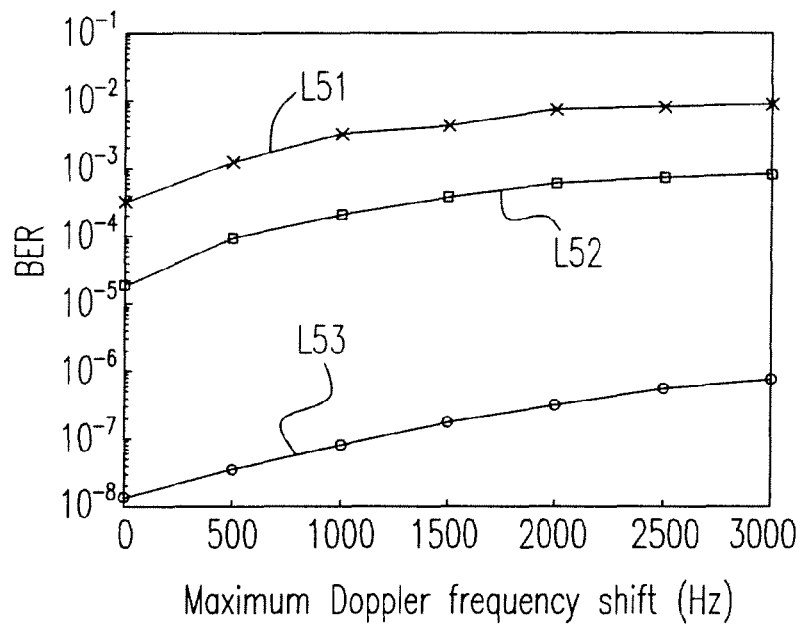
Figure 5B:
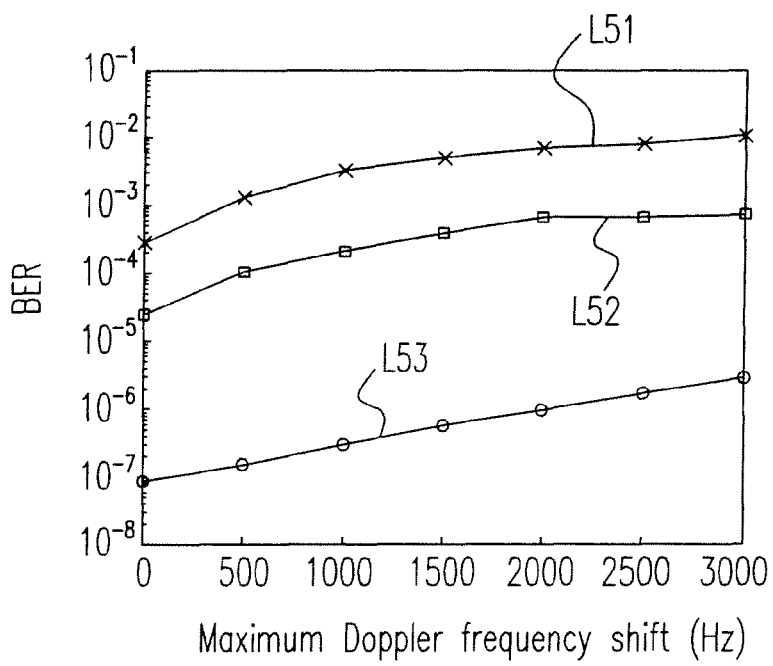

of residual ICI outside different bandwidths K of the channel matrix, with K=0, 1 and 2 for FIGS. 2A, 2B and 2C, respectively;

FIG. 3 is a block diagram showing the discrete-time baseband equivalent model for the signal processing on the residual ICI and the channel noise under the OFDM system in one embodiment of the present invention;

FIGS. 4A and 4B are diagrams showing the computer-simulated result for the performance of the method of the present invention incorporated with maximum likelihood sequence estimation (MLSE) signal detection in different channels; and FIGS. 5A and 5B are diagrams showing the performance of the method of the present invention compared with that of the conventional method without whitening the residual ICI in different channels in the absence of channel noise.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In the conventional techniques, the residual ICI is usually ignored, and accordingly adds to any other noise that may be present to interfere with signal detection and leads to an irreducible error floor. It is found in the present invention that the residual ICI has certain correlation characteristics, and the performance of signal transmission can be improved by a whitening of the residual ICI and the channel noise based on the correlation characteristics.

Figure 1:
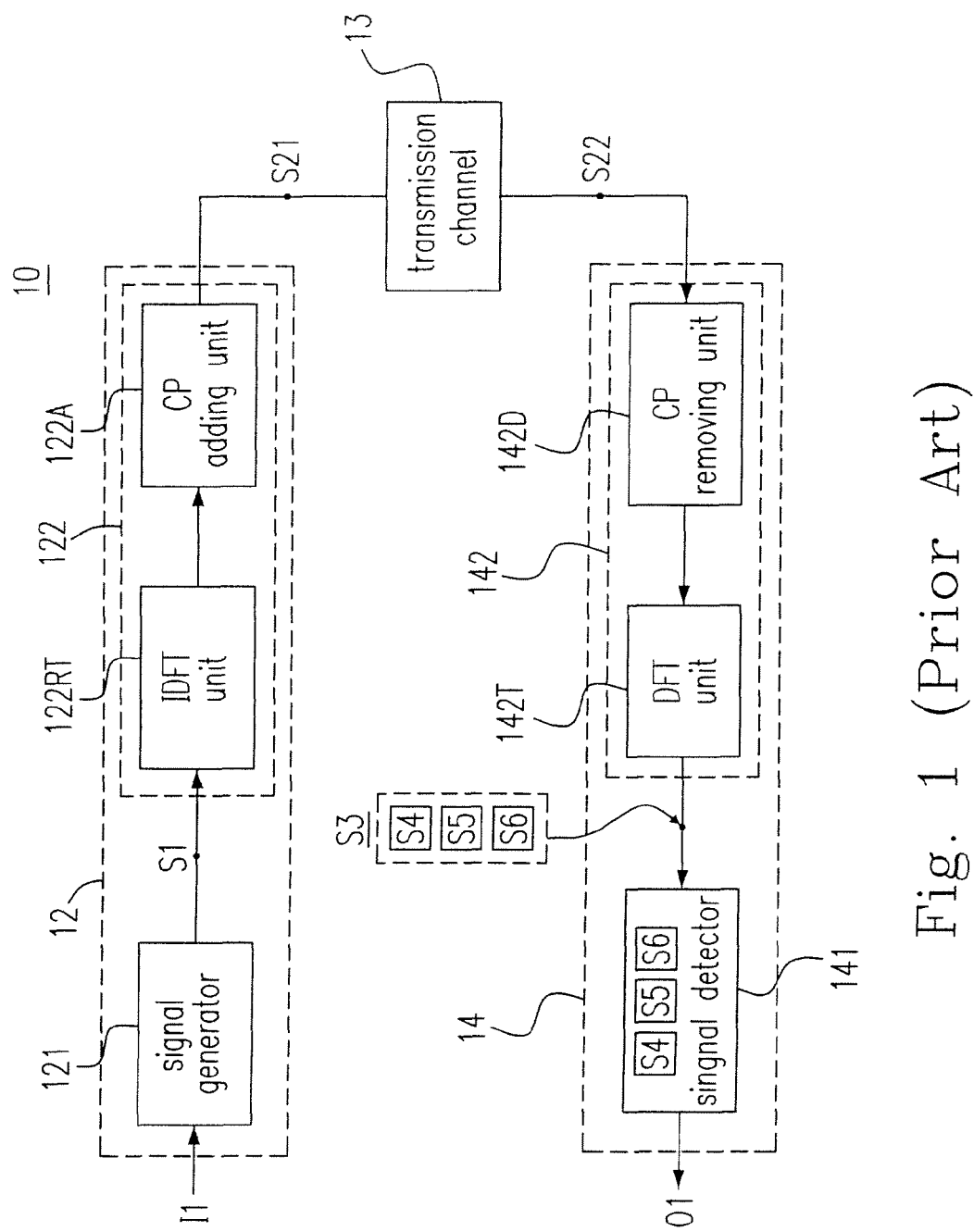
FIG. 1 is a block diagram showing a discrete-time baseband equivalent model of the orthogonal frequency division multiplexing (OFDM) system in the prior art.

The mathematical derivation for the method in one embodiment of the present invention is described below with reference to the illustration in FIG. 1. For example, the mathematical relationship between the transmitted time-domain signal S21 and the received time-domain signal S22 can be expressed as in the following equation (3):

$$y_n = \sum_{l=0}^{L-1} h_{n,l} x_{n-l} + w_n \tag{3}$$

wherein L is the number of multipaths, $h_{n,l}$ denotes the complex gain of the l path at time n, and $w_n$ denotes the additive complex channel noise at time n (where $w_n$ is often assumed to be white Gaussian, i.e., AWGN).

We assume that the length of the cyclic prefix (CP) is sufficient to cover the length of the channel impulse response (CIR), $(L-1)T_{sa}$, where $T_{sa}$ denotes the sampling period. This assumption is made to simplify some mathematics but in no way limits the application of the present invention to this condition. For example, if the CIR should be longer than the CP, then we may break it into two parts, where the first part has a length $(L-1)T_{sa}$ that is not longer than the length of the CP, and the second part contains the remainder of the CIR with its effects incorporated into $w_n$.

The mathematical relationship of the receiver frequency-domain signal S3 and the transmitter frequency-domain signal S1 in the discrete Fourier transform (DFT) domain of the OFDM communication system can be expressed as in the following equation (4):

$$Y_m = \sum_{k=0}^{N-1} \sum_{l=0}^{L-1} X_k H_l^{(m-k)} e^{-j2\pi l k/N} + W_m, \; 0 \le m \le N-1, \tag{4}$$

wherein $W_m$ denotes the DFT of $w_m$ and $H_l^{(k)}$ is the frequency spreading function of the lth path, which can be expressed as in the following equation (5):

$$H_l^{(k)} = \frac{1}{N} \sum_{n=0}^{N-1} h_{n,l} e^{-j2\pi n k/N}. \tag{5}$$

For a time-invariant channel, $H_l^{(k)}$ vanishes $\forall k \neq 0$, implying absence of ICI. The equation (4) can be transformed into a matrix-vector form as shown in the following equation (6):

$$y = Hx + w, \tag{6}$$

where $y=[Y_0, \ldots, Y_{N-1}]'$, $x=[X_0, \ldots, X_{N-1}]'$, $w=[W_0, \ldots, W_{N-1}]'$, and H denotes a channel matrix given by $$H = \begin{bmatrix} a_{0,0} & a_{0,1} & \cdots & a_{0,N-1} \\ a_{1,0} & a_{1,1} & \cdots & a_{1,N-1} \\ \vdots & \vdots & \ddots & \vdots \\ a_{N-1,0} & a_{N-1,1} & \cdots & a_{N-1,N-1} \end{bmatrix},$$

with ' denoting transpose and $$a_{m,k} = \sum_{l=0}^{L-1} H_l^{(m-k)} e^{-j2\pi k l/N}.$$

Note that $a_{m,k}$ denotes the coefficient of the contribution of $X_k$ in the received signal at subcarrier m.

A conventional receiver is designed based on a band approximation to H, in which a symmetric approximation with one-sided bandwidth K is considered, that is, it makes the approximation that $a_{m,k}=0$ for $|(m-k) \% N|>K$, where K is a nonnegative integer and % denotes modulo operation. Therefore, in signal detection under this band approximation to H, the ICI considered at each subcarrier consists of contributions from at most 2K nearest (circularly) subcarriers. In other words, the set of in-band terms (i.e., the terms contained in the main signal S4 mentioned above) for the mth row of the above H matrix consist of the union of $\{a_{m,0}, a_{m,1}, \ldots, a_{m,m+K}\}$ and $\{a_{m,m-K+N}, a_{m,m-K+1+N}, \ldots, a_{m,N-1}\}$ when $0 \le m \le K-1$, the set $\{a_{m,m-K}, a_{m,m-K+1}, \ldots, a_{m,m+K}\}$ by itself when $K \le m \le N-K-1$, and the union of $\{a_{m,0}, a_{m,1}, \ldots, a_{m,m+K-N}\}$ and $\{a_{m,m-K}, a_{m,m-K+1}, \ldots, a_{m,N-1}\}$ when $N-K \le m \le N-1$. The terms located outside the area of the 2K in-band terms are the out-of-band terms; they make up the residual ICI S5 mentioned above and cause the irreducible error floor. In other words, the band approximation method of retaining the main terms around the diagonal and ignoring the out-of-band terms may increase the noise level in the system and interfere with signal detection. As a result, although the band approximation may possibly solve the complexity issue in receiver design, it leads to an irreducible error floor.

In order to solve the above mentioned problem, the correlation of the residual ICI due to out-of-band terms is exploited in the present invention to enhance signal detection. For convenience, in the below let n stand for n % N.

Assume a receiving algorithm designed to handle 2K terms of nearest-neighbor ICI. The summation over k in the equation (4) can be partitioned into an in-band part and an out-of-band (i.e. residual ICI) part, as shown in the following equation (7):

$$Y_m = \sum_{k=m-K}^{m+K} \sum_{l=0}^{L-1} H_l^{(m-k)} e^{-j2\pi lk/N} X_k +$$

$$\underbrace{\sum_{k \notin [m-K, m+K]} \sum_{l=0}^{L-1} H_l^{(m-k)} e^{-j2\pi lk/N} X_k}_{\cong c_m} + W_m. \quad (7)$$

Alternatively, equation (7) may be rewritten as shown in the following equations (8) and (9):

$$Y_m = \sum_{k=m-K}^{m+K} a_{m,k} X_k + c_m + W_m \quad (8)$$

where $$c_m = \sum_{k \notin [m-K, m+K]} a_{m,k} X_k \quad (9)$$

with $c_m$ being the residual ICI, S5. It can be understood from the equation (7) that the receiver frequency-domain signal 53 can be divided into three parts, namely, the main signal S4, the residual ICI S5 and the channel noise S6. When N is sufficiently large, we may invoke the central limit theorem and model the residual ICI as Gaussian. The autocorrelation of $c_m$ can be derived from the equation (9). For example, a wide-sense stationary uncorrelated scattering (WSSUS) channel has the characteristic expressed in the following equation (10):

$$E\{h_{n,l} h^*_{n-q, l-m}\} = \sigma_l^2 r_l(q) \delta(m), \quad (10)$$

where $\sigma_l^2$ denotes the variance of the lth tap gain, $r_l(q)$ denotes the normalized autocorrelation of the tap gain (where $r_l(0)=1$), and $\delta(m)$ is the Kronecker delta function. For convenience, assume that $$\sum_l \sigma_l^2 = 1.$$

Moreover, assume the paths are subject to Rayleigh fading so that $r_l(q)$ can be expressed as in the following equation (11):

$$r_l(q) = J_0(2\pi f_d T_{sa} q), \quad (11)$$

where $J_0(\bullet)$ denotes the zeroth-order Bessel function of the first kind and $f_d$ denotes the maximum Doppler frequency. Then the autocorrelation of $c_m$ can be expressed as in the following equation (12):

$$E[c_m c^*_{m+r}] = E_s \times \sum_{\substack{k \notin [m-K, m+K] \\ \cup [m+r-K, m+r+K]}} \sum_{l=0}^{L-1} E\left[H_l^{(m-k)} H_l^{(m+r-k)*}\right]$$

-continued $$= E_s \delta(r) - \frac{E_s}{N^2} \times \sum_{n=0}^{N-1} \sum_{n'=0}^{N-1} J_0(2\pi f_d T_{sa}(n-n')) e^{j2\pi n' r/N} \times$$

$$\sum_{\substack{k \in [m-K, m+K] \\ \cup [m+r-K, m+r+K]}} e^{j2\pi(n-n')(k-m)/N}$$

where r is an integer, $E_s$ is the transmitted symbol energy, and $X_k$ is assumed to be white for mathematical development.

FIGS. 2A-2C illustrate the normalized autocorrelation $$\frac{E[c_m c^*_{m+r}]}{E[|c_m|^2]}$$

of the residual ICI for K=0-2, respectively, as calculated from the above equation (12) wherein it is assumed that $r_l(q)=J_0(2\pi f_d T_{sa} q)$, where N=128, subcarrier spacing $f_s$=10.94 kHz and $T_{sa}$=1/(N$f_s$), which are some of the Mobile WiMAX system parameters. FIG. 2A shows two pairs of curves L21a and L22a; FIG. 2B shows six pairs of curves L21b, L22b, L23b, L24b, L25b and L26b; and FIG. 2C shows five pairs of curves L21c, L22c, L23c, L24c and L25c. The curve pairs L21a and L22a in FIG. 2A correspond to r=1 and r=2, respectively. It is seen that the normalized autocorrelation of the residual ICI in these cases is positive, with L21a showing values even as high as 0.6. Thus, it can be inferred that the residual ICI has high autocorrelation at the bandwidth K=0. Similarly, the curve pairs L21b, L22b, L23b, L24b, L25b and L26b in FIG. 2B correspond to r=1, r=2, r=3, r=4, r=5 and r=6, respectively. It is apparent that the normalized autocorrelation of the residual ICI in these cases is positive, with L21b showing values even as high as 0.78. Thus, it can be inferred that the residual ICI has high autocorrelation at the bandwidth K=1. The curve pairs L21c, L22c, L23c, L24c and L25c in the FIG. 2C correspond to r=1, r=2, r=3, r=4 and r=5, respectively. It is apparent that the normalized autocorrelation of the residual ICI in these cases is positive, with L21c showing values even as high as 0.84. Thus, it can be inferred that the residual ICI has high autocorrelation at the bandwidth K=2.

From the above three examples with the diagrammatic illustrations, it is seen that the residual ICI at nearby subcarriers has high autocorrelation. Such high autocorrelation can be exploited to suppress the residual ICI. Therefore, the present invention performs a whitening on the residual ICI and the channel noise. Interestingly, it can be observed that the normalized autocorrelation $$\frac{E[c_m c^*_{m+r}]}{E[|c_m|^2]}$$

is not sensitive to the variation in the maximum Doppler frequency. The quantities $f_d$ and $T_{sa}$ in the equation (12) appear only in a product form. As a result, variation in one of them cannot be distinguished from variation in the other. It can thus be inferred that the normalized autocorrelation of the residual ICI is not sensitive to $T_{sa}$, either. Moreover, from equation (12) it can also be seen that the normalized autocorrelation of residual ICI is neither sensitive to the multipath channel profile. In addition, note that the normalized autocorrelation of the residual ICI is also insensitive to the DFT size N and the transmitted symbol energy $E_s$. In summary, the value of the normalized autocorrelation $$\frac{E[c_m c_{m+r}^*]}{E[|c_m|^2]}$$

is nearly determined after the bandwidth K is given. The value of the normalized autocorrelation is insensitive to the variations in a plurality of the parameters related to the normalized autocorrelation function. These parameters include the maximum Doppler frequency $f_d$, the Doppler power spectral density, the multipath channel profile, the sampling period $T_{sa}$, the DFT size N, the OFDM symbol time and the transmitted symbol energy $E_s$.

The following mathematical derivation can prove that the high autocorrelation of the residual ICI and the insensitivity of the autocorrelation of the residual ICI to various system parameters also hold for other types of fading channels. Therefore, the above conclusion has broad application in wireless communication.

Consider a polynomial series expansion of $h_{n,l}$ for each path $l$ along the time dimension and retain only the linear term. This results in an approximation to $h_{n,l}$ as shown in the following equation (13):

$$h_{n,l} \approx \bar{h}_l + \left(n - \frac{N-1}{2}\right) s_l \qquad (13)$$

where, for example, we may let $$\bar{h}_l = \frac{1}{N} \sum_{n=0}^{N-1} h_{n,l}$$

and let $s_l$ be chosen to minimize the mean square approximation error of $h_{n,l}$ over $n \in [0, N-1]$. Once the $\bar{h}_l$ and $s_l$ are selected, we can obtain the following relationship (14):

$$H_l^{(k)} \approx \begin{cases} \bar{h}_l, & k = 0, \\ \frac{-s_l}{1 - e^{-j2\pi k/N}}, & k = 1, \ldots, N-1. \end{cases} \qquad (14)$$

By substituting the above into the equation (12), the following equation (15) can be obtained.

$$E[c_m c_{m+r}^*] \approx$$

$$E_s \times E\left[\sum_{l=0}^{L-1} |s_l|^2\right] \times \underbrace{\sum_{k \notin [-K,K] \cup [-K-r, K-r]} \frac{1}{(1 - e^{-j2\pi k/N})(1 - e^{j2\pi(k+r)/N})}}_{\triangleq \rho(K,r,N)}$$

It can be understood from the above that the normalized autocorrelation of the residual ICI depends only on K and N; the other parameters are cancelled out upon normalization. When N is large, the normalized autocorrelation, which is essentially given by $\rho(K,r,N)/\rho(K,0,N)$, is substantially independent of the DFT size N from the following equations (16), (17) and (18).

$$\rho(K,r,N) = \rho_0(r,N) - \rho_1(K,r,N) \qquad (16)$$

wherein $$\rho_0(r, N) \approx \begin{cases} \frac{N^2}{12}, & r = 0, \\ \frac{N^2}{2\pi^2 r^2}, & r \neq 0, \end{cases} \qquad (17)$$

$$\rho_1(K, r, N) = \sum_{k \in [-K, K] \cup [-K-r, K-r] \setminus \{0, -r\}} \frac{N^2}{4\pi^2 k(k+r)}. \qquad (18)$$

From the foregoing approximation, the following relationship (19) can be obtained after some straightforward algebra:

$$\frac{E[c_m c_{m+1}^*]}{E[|c_m|^2]} \approx \frac{\rho(K, 1, N)}{\rho(K, 0, N)} \approx \frac{1 - \sum_{k=1}^{K} 1/[k(k+1)]}{\pi^2/6 - \sum_{k=1}^{K} 1/k^2} = \frac{1/(K+1)}{\pi^2/6 - \sum_{k=1}^{K} 1/k^2}. \qquad (19)$$

For example, the resulting approximate values for K=0-2 are 0.6079, 0.7753 and 0.8440, respectively, which agree well with the theoretical and the simulated values depicted in the curves L12a, L21b and L21c in FIGS. 2A-2C.

In effect, although only a multipath Rayleigh fading channel model is considered in the numerical analysis and channel simulation presented in FIGS. 2A-2C, it can be proved from the above approximations that the high autocorrelation and the insensitivity of the autocorrelation of the residual ICI to various system parameters also hold for other types of fading channels, and accordingly can be applied broadly in wireless communication.

To illustrate how the above results can be used in practical systems to obtain a plurality of estimated correlation values of the residual ICI and the channel noise for the frequency-domain signal, we give some examples now. For instance, the decision circuit's output data in the receiver system can be used to reconstruct the main signal which can be subtracted from the receiver frequency-domain signal to obtain a sum of the residual ICI and the channel noise, namely, $c_m + W_m$, for each subcarrier m. By calculating the sample-average correlation of $c_m + W_m$, that is, the average of $(c_m + W_m)(c_{m+r} + W_{m+r})^*$, for any r, we can obtain one estimated correlation value. In particular, an estimate of the average power of the residual ICI and the channel noise is obtained if we let r=0 and an estimate of the correlation of the residual ICI $E[c_m c_{m+r}^*]$ is obtained if we let $r \neq 0$. The obtained estimate of $E[c_m c_{m+r}^*]$ for r=1 can be used in combination with the observation that $$\frac{E[c_m c_{m+1}^*]}{E[|c_m|^2]} \approx \frac{\rho(K, 1, N)}{\rho(K, 0, N)}$$

to obtain an estimate of the residual ICI's average power $E[|c_m|^2]$. Conversely, any estimate of $E[|c_m|^2]$ can also be used to estimate the unnormalized correlation values of the residual ICI, $E[c_m c_{m+r}^*]$, for r=1, 2, 3, . . . , by applying the relationship that $$\frac{E[c_m c_{m+r}^*]}{E[|c_m|^2]} \approx \frac{\rho(K, r, N)}{\rho(K, 0, N)}.$$

Furthermore, by subtracting an estimated $E[|c_m|^2]$ from the estimated average power of the residual ICI and the channel noise via the means described above, we can obtain an estimate of the channel noise power. Such are some example ways to obtain a plurality of estimated correlation values of the residual ICI and the channel noise for the frequency-domain signal.

Please refer to FIG. 3, which is the block diagram showing the discrete-time baseband equivalent model for the signal processing on the residual ICI and the channel noise under the OFDM system 30 in one embodiment of the present invention. In FIG. 3, the OFDM system includes a transmitter 32, a transmission channel 33 and a receiver 34. The transmitter 32 receives a transmitter input signal I3 and generates a transmitted time-domain signal in response to the transmitter input signal I3. For example, the transmitted time-domain signal is also referred to in this invention as a frequency division multiplexing signal or a frequency division multiplexing time-domain signal. The transmitter 32 includes a signal generator 321 and a processing unit 322. The processing unit 322 includes an inverse discrete Fourier inverse transforming (IDFT) unit 322 RT and a cyclic prefix (CP) adding unit 322A. The receiver 34 includes a processing unit 342 and a signal detecting unit 341. The processing unit 342 includes a CP removing unit 342D and a discrete Fourier transforming (DFT) unit 342T. The signal detecting unit 341 includes a whitening filter 341W and a signal detecting unit 341D. The processing unit 322 is coupled to the signal generator 321 and generates a transmitted time-domain signal S21 in response to the transmitter input signal I3. The transmission channel 33 outputs a received time-domain signal S22 in response to the transmitted time-domain signal S21. For example, the received time-domain signal S22 is also referred to in this invention as a frequency division multiplexing signal or a frequency division multiplexing time-domain signal. The receiver 34 receives the received time-domain signal S22, and generates a receiver output signal O3 in response to the received time-domain signal S22. The processing unit 342 is coupled to the transmission channel 33, receives the received time-domain signal S22, and generates a receiver frequency-domain signal S3 in response to the received time-domain signal S22.

The transmitter input signal I3 is input to the transmitter 32, and the transmitter frequency-domain signal S1 of the frequency division multiplexing property is generated after passing the transmitter input signal I3 through the signal generator 321. The transmitted time-domain signal S21 is generated from the transmitter frequency-domain signal S1 by passing the transmitter frequency-domain signal S1 through the inverse discrete Fourier transforming (IDFT) unit 322RT and the CP adding unit 322A successively. The received time-domain signal S22 is obtained by passing the transmitted time-domain signal S21 through the transmission channel 33. The received time-domain signal S22 is input to the receiver 34. The receiver frequency-domain signal S3 is generated by passing the received time-domain signal S22 of the frequency division multiplexing property through the CP removing unit 342D and the discrete Fourier transforming (DFT) unit 342T successively. The receiver frequency-domain signal S3 includes three components: a main signal S4, a residual ICI S5 and a channel noise S6. The receiver frequency-domain signal S3 is input to the signal detector 341D to be detected. The signal detector may employ at least one of a plurality of detection methods including the least squares, the minimum mean square error, the iterative minimum mean square error, the decision feedback equalization and the maximum likelihood sequence estimation (MLSE) methods.

Besides, the whitening filter 341W analyzes the receiver frequency-domain signal S3 to obtain correlation values of the residual ICI S5 and the channel noise S6, from which the whitening filter coefficients are determined and a receiver output signal O3 is generated after the signal processing performed by the whitening filter 341W and the signal detector 341D.

In the present embodiment, a signal detection method based on maximum likelihood sequence estimation (MLSE) is utilized to demonstrate the benefit of whitening the residual ICI S5 and the channel noise S6. For simplicity, rather than performing whitening over a complete sequence, a "blockwise whitening" is performed over windows of size 2q+1, as explained below. The blocks on which the whitening is performed may partially overlap one another. A mathematical development of the present embodiment is provided as follows. A (2q+1)-vector of the signal sample values in the receiver frequency-domain signal S3 centered at the $m^{th}$ subcarrier can be expressed as in the following equation (20):

$$y_m = [Y_{m-q} \ldots Y_m \ldots Y_{m+q}]' = H_m x_m + w_m \tag{20}$$

where $x_m = [X_{m-p} \ldots X_m \ldots X_{m+p}]'$ for some integer p, $H_m$ is a $(2q+1) \times (2p+1)$ submatrix of H of bandwidth K, and $w_m$ collects all the right-hand-side (RHS) terms in the equation (4) or equivalently equation (6) for $Y_k$, $m-q \leq k \leq m+q$, that do not appear in $H_m x_m$. The elements of $w_m$ are circularly symmetric complex Gaussian. Let $K_w$ denote the normalized covariance matrix of $w_m$, which can be obtained through theoretical derivation, computer simulation or the detected data. The aforementioned blockwise whitening of the residual ICI plus the channel noise $w_m$ can be expressed as in the equation (21):

$$\tilde{y}_m \equiv K_w^{-\frac{1}{2}} y_m = \underbrace{K_w^{-\frac{1}{2}} H_m}_{\square \tilde{H}_m} x_m + \underbrace{K_w^{-\frac{1}{2}} w_m}_{\square \tilde{w}_m} \tag{21}$$

where the premultiplication of $y_m$ by $$K_w^{-\frac{1}{2}}$$

signifies the function of the whitening filter 341W. The whitening filter $$K_w^{-\frac{1}{2}}$$

is not unique. For example, one choice is to consider the singular value decomposition (SVD) of $K_w$ as $K_w = U\Sigma U^H$, where U is a unitary matrix and $\Sigma$ is a diagonal matrix with positive diagonal values. Then one can let $$K_w^{-\frac{1}{2}} = U\Sigma^{-\frac{1}{2}} U^H,$$

where each diagonal element of $$\Sigma^{-\frac{1}{2}}$$

is equal to the square root of the corresponding diagonal element of $\Sigma^{-1}$. If the maximum likelihood (ML) detection principle is employed for detection of $x_m$ for some m, then the following equation (22) is obtained:

$$\hat{x}_m = \underset{x_m}{\arg\min} \|\tilde{y}_m - \tilde{H}_m x_m\|^2 \quad (22)$$

where $\hat{x}_m$ is the detector output for $x_m$.

As indicated, the detection method in the present embodiment is based on MLSE. In order to reduce the complexity, in this method the $\tilde{w}_m$, m=0, ..., N−1, are treated as if they were mutually independent, even though this may at best be nearly so. The conditional probability density function (PDF) of the receiver frequency-domain signal given the transmitter frequency-domain signal can then be expressed as in the following equation (23).

$$f(\tilde{y}_0, \tilde{y}_1, \ldots, \tilde{y}_{N-1} \mid x_0, x_1, \ldots, x_{N-1}) = \quad (23)$$

$$f(\tilde{w}_0, \tilde{w}_1, \ldots, \tilde{w}_{N-1}) = \prod_{n=0}^{N-1} f(\tilde{w}_n)$$

With this approximation, the log-likelihood values can be computed recursively as shown in the following equation (24):

$$\Lambda_k \equiv \log f(\tilde{w}_0, \tilde{w}_1, \ldots, \tilde{w}_{N-1}) = \Lambda_{k+1} + \log f(\tilde{y}_k - \tilde{H}_k x_k), k=1, \ldots, N-1. \quad (24)$$

Hence the standard Viterbi algorithm can be employed in the signal detector to find the optimal estimate of $x_k$, k=0, ..., N−1, for O3.

Disregarding some common terms that do not affect sequence detection, in the Viterbi algorithm one may use $\|\tilde{y}_k - \tilde{H}_k x_k\|^2$ as the branch metric instead of log $f(\tilde{y}_k - \tilde{H}_k x_k)$. A tradeoff between complexity and performance can be achieved by different choices of q, p and K. For example, consider the setting of K=1 and q=1. Then when p=1, the following relationships (25) and (26) can be obtained.

$$H_m = \begin{bmatrix} a_{m-1,m-1} & a_{m-1,m} & 0 \\ a_{m,m-1} & a_{m,m} & a_{m,m+1} \\ 0 & a_{m-1,m} & a_{m-1,m+1} \end{bmatrix}, \quad (25)$$

$$K_w \mid_{SNR\infty} = \begin{bmatrix} 1.785 & 1.16 & 1.16 \\ 1.16 & 1 & 1.16 \\ 1.16 & 1.16 & 1.785 \end{bmatrix}, \quad (26)$$

where the additional marking "$\mid_{SNR\infty}$" to $K_w$ indicates that the correlation values given in the matrix pertain to residual ICI alone (in absence of channel noise).

When p=2, the following relationships (27) and (28) can be obtained.

$$H_m = \begin{bmatrix} a_{m-1,m-2} & a_{m-1,m-1} & a_{m-1,m} & 0 & 0 \\ 0 & a_{m,m-1} & a_{m,m} & a_{m,m+1} & 0 \\ 0 & 0 & a_{m-1,m} & a_{m-1,m+1} & a_{m-1,m+2} \end{bmatrix}, \quad (27)$$

$$K_w \mid_{SNR\infty} = \begin{bmatrix} 1 & 0.775 & 0.645 \\ 0.775 & 1 & 0.775 \\ 0.645 & 0.775 & 1 \end{bmatrix}. \quad (28)$$

To illustrate the substantial gain that the present invention can yield to the performance of signal transmission and reception in a communication system, the below now provides some computer simulation results that have been obtained for different conditions, using the method of the present invention incorporated with an MLSE signal detection means as outlined above.

It is assumed that the receiver 34 has perfect knowledge of the channel matrix within band K and perfect knowledge of the covariance matrix $K_w$ of residual ICI plus channel noise, where the $K_w$ is obtained in advance via computer simulation. In addition to the MLSE signal detection with whitening of the residual ICI and the channel noise, a matched-filter bound (MFB) is also obtained in some conditions to provide a lower bound for the attainable transmission error probability under the respective conditions. The MFB is obtained by fully canceling the residual ICI outside the band K followed by MLSE signal detection, under perfect knowledge of the channel matrix.

For example, please refer to FIGS. 4A and 4B, which are diagrams showing some computer simulation results for the performance of the method of the present invention incorporated with MLSE signal detection in different channels. These results have been obtained under the conditions that the size of the discrete Fourier transform (DFT) is 128, the sample period is 714 ns, the subcarrier spacing is 10.94 kHz, and the modulation employed of the subcarriers is quadrature phase shift keying (QPSK). FIG. 4A shows the bit error rate (BER) results for the COST 207 6-tap TU channel at the setting K=p=q=1 and the signal-to-noise ratios (SNRs) 31 dB, 48 dB, and infinity. FIG. 4B does the same for the 3-tap SUI-4 channel. The maximum Doppler frequency shift of 3,500 Hz as indicated in the horizontal axes of both figures corresponds to a carrier frequency mobile speed product of 3,780 GHz-km/h. The covariance matrix $K_w$ in each simulation condition has been estimated in advance by computer simulation. The performance curves marked L41 in both FIGS. 4A and 4B are the results from utilizing the method of the present invention at SNR equal to 31 dB, the curves marked L42 are the results from utilizing the method of the present invention at SNR equal to 48 dB, and the curves marked L43 are the results from utilizing the method of the present invention at infinite SNR. The curves marked M1 show the MFB for K=1 at SNR equal to 31 dB, and the curves marked M2 show the MFB for K=1 at SNR equal to 48 dB. By comparing FIGS. 4A and 4B, it can be seen that the performance of the method of the present invention stays rather similar even under different channel characteristics. That is, the present invention can be applied to channels of varying characteristics, not just to some particular examples.

For further instance, please refer to FIGS. 5A and 5B, which are diagrams showing the performance of the method of the present invention, compared with that of the conventional MLSE method without whitening the residual ICI, under several different channels in the absence of additive channel noise. The performance results have been obtained under the conditions that the size of DFT is 128, the sampling period is 714 ns, the subcarrier spacing is 10.94 kHz, the SNR is infinite, and the modulation employed of the subcarriers is QPSK. In addition, the conventional MLSE method employs the parameter setting K=1 and the method of the present invention employs the parameter setting K=q=1. FIG. 5A shows the results for the COST 207 6-tap TU channel; while FIG. 5B that for the 3-tap SUI-4 channel. The curves marked L51 in both FIGS. 5A and 5B depict the performance result for the conventional MLSE method without whitening the residual ICI, the curves marked L52 in both figures depict that for the method of the present invention at p=2, and the curves marked L53 that for the method of the present invention at p=1. As the results are for an infinite SNR, they give the BER error floor in each case. It can be seen from both FIGS. 5A and 5B that, by using the method of the present invention, it is possible to reduce the BER error floors by several orders in magnitude as compared to the conventional method without whitening the residual ICI. Therefore, it can be known from the above that the method of the present invention can yield great improvements to the signal transmission performance in the communication system.

It can further be understood from FIGS. 4A and 4B that in addition to the significant performance improvement in receiving of signals, this receiving method can exploit the time diversity in the time-varying channel. That is, as evidenced by the curves marked L41 and L42 in FIGS. 4A and 4B, the performance at a finite SNR by utilizing this receiving method gets better as the maximum Doppler frequency shift goes up, until it hits the limit prescribed by the infinite SNR condition. The above means that the method of the present invention can effectively suppress the residual ICI and can closely approach the optimal receiving performance provided by the MFB. On the other hand, the conventional receiving method without whitening cannot yield the above performance at a reasonable complexity.

Indeed, the proposed receiving method can also be used in association with a closed loop transmission mechanism such as the closed loop channel quality indicator (CQI) feedback or channel sounding. In the case of closed loop CQI feedback, for example, the channel state information after the whitening, the maximum Doppler frequency shift or the average power of the residual ICI can be the fed-back CQI which would allow the transmitter to understand the receiving condition so as to improve the transmission performance by dynamically adapting its transmission scheme. In the case where channel sounding is performed, for example, the above CQI can be obtained by the transmitter itself from the received sounding signal. Such are some further example applications of the present invention.

In summary, in the present invention, it is observed that the residual ICI at nearby subcarriers after transmission over a mobile time-varying channel has high autocorrelation, and moreover the values of the normalized autocorrelation function are nearly determined after the bandwidth K is given. The values of the normalized autocorrelation function are insensitive to the variations in a plurality of the parameters related to the normalized autocorrelation function. These parameters include the maximum Doppler frequency shift ($f_d$), the Doppler power spectral density, the multipath channel profile, the sampling period of the frequency division multiplexing signal, the size of DFT, the symbol period of the frequency division multiplexing signal and the average transmitted symbol energy ($E_s$). Thus, the high normalized correlation of residual ICI in nearby subcarriers and its ease of estimation are very suitable for application in signal reception in a practical communication system.

For example, the above-mentioned correlation can be exploited for various signal detection methods by incorporating a whitening operation on the residual ICI and the channel noise so as to yield a better signal detection performance. An MLSE-based signal detection method is exemplified in one embodiment of the present invention. It is demonstrated that the method with whitening of the residual ICI and the channel noise can further lower the ICI-induced error floor compared to signal processing that only treats the main ICI terms. The signal transmission performance can thus be improved by utilizing the technique of the present invention. As such, we can further introduce a closed loop transmission mechanism into the method of the present invention, such as the closed loop channel quality indicator (CQI) feedback or channel sounding. In the case of closed loop CQI feedback, for example, the channel state information after the whitening, the maximum Doppler frequency shift or the average power of the residual ICI can be the fed-back CQI which would allow the transmitter to understand the receiving condition so as to improve the transmission performance by dynamically adapting its transmission scheme. In the case where channel sounding is performed, for example, the above CQI can be obtained by the transmitter itself from the received sounding signal.

The following embodiments of the present invention are provided as examples.

1. A method for processing a frequency division multiplexing signal transmitted in a channel, comprising steps of:
   a) receiving the frequency division multiplexing signal having a residual intercarrier interference (ICI) and a channel noise and transmitted in plural subcarriers;
   b) performing a cyclic prefix removal and a discrete Fourier transform for the frequency division multiplexing signal to obtain a frequency-domain signal;
   c) analyzing the frequency-domain signal to obtain a plurality of correlation values for the residual ICI and the channel noise; and
   d) performing a communication signal processing for the frequency division multiplexing signal based on at least one of the plural correlation values.

2. A method of the first embodiment, wherein the residual ICI comes from at least one of a time-varying channel and a carrier frequency shift.

3. A method in one of the above embodiments, wherein the frequency division multiplexing signal comprises one selected from a group consisting of an orthogonal frequency division multiplexing signal, an orthogonal frequency division multiple access signal, a single-carrier frequency-domain equalization signal, a single-carrier frequency division multiplexing signal, and a single-carrier frequency division multiple access signal.

4. A method in one of the above embodiments, wherein the step d) is performed by at least one of whitening on the frequency division multiplexing signal, and obtaining a channel information parameter after a computation based on at least one of the plural correlation values.

5. A method in one of the above embodiments, wherein the step d) further comprises a step of performing a signal detection method for the frequency-domain signal in the communication signal processing.

6. A method in one of the above embodiments, wherein the signal detection method comprises one selected from a group consisting of a least squares, a minimum mean square error, an iterative minimum mean square error, a decision feedback equalization and a maximum likelihood sequence estimation.

7. A method in one of the above embodiments, wherein the step d) further comprises a step of providing one of a receiver and a transmitter for performing the communication signal processing, which includes a closed loop transmission control mechanism.

8. A method in one of the above embodiments, wherein the step d) further comprises a step of providing a transmitter for performing the communication signal processing, which includes a channel sounding mechanism.

9. A method in one of the above embodiments, wherein in step c), the correlation values are ones selected from a group consisting of an estimated average power of the residual ICI and the channel noise, an estimated average power of the residual ICI, an estimated average power of the channel noise, an estimated correlation value of the residual ICI, and a combination thereof.

10. A method in one of the above embodiments, wherein in step c), at least one of the correlation values is obtained by using a decision circuit's output to subtract a main signal from the frequency-domain signal and then using a result to compute a sample-average correlation.

11. A method in one of the above embodiments, wherein in step c), at least one of the correlation values is obtained from a known correlation value by using a known relationship between two of the correlation values.

12. A frequency division multiplexing communication system, having a plurality of correlation values and comprising:
 a channel for transmitting a frequency division multiplexing signal, which is transmitted in plural subcarriers and has a frequency-domain signal including a residual intercarrier interference (ICI) and a channel noise; and
 a first means for receiving the frequency-domain signal, and processing a communication signal based on the plural correlation values for the residual ICI and the channel noise, wherein the communication signal is processed through at least one of a whitening operation and an obtainment of a channel information parameter after a computation based on at least one of the plural correlation values.

13. A system in one of the above embodiments, having a closed loop transmission control mechanism and further comprising a second means, based on the closed loop transmission control mechanism, for obtaining one selected from a group consisting of the plural correlation values for the residual ICI and the channel noise, the channel information parameter, a maximum Doppler frequency shift, an average power of the residual ICI and a combination thereof, so as to adjust a method of transmitting the frequency division multiplexing signal.

14. A system in one of the above embodiments, wherein the method of transmitting the frequency division multiplexing signal comprises one selected from a group consisting of a transmission antenna array configuration, a channel coding, a modulation, a pre-coding, an adjustment of a discrete Fourier transform size, an adjustment of a cyclic prefix size and a combination thereof.

15. A system in one of the above embodiments, wherein the second means comprises a transmitter.

16. A system in one of the above embodiments, where the first means comprises a receiver.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for processing a frequency division multiplexing signal transmitted in a channel, comprising steps of:
 a) receiving the frequency division multiplexing signal having a residual intercarrier interference (ICI) and a channel noise and transmitted in plural subcarriers;
 b) performing a cyclic prefix removal and a discrete Fourier transform for the frequency division multiplexing signal to obtain a frequency-domain signal;
 c) analyzing the frequency-domain signal to obtain a plurality of correlation values for the residual ICI and the channel noise;
 d) performing a communication signal processing for the frequency division multiplexing signal based on at least one of the plural correlation values; and
 e) performing a signal detection method for the frequency-domain signal, wherein the signal detection method includes a maximum likelihood sequence estimation, and the maximum likelihood sequence estimation is performed based on a sum-form log-likelihood function.

2. A method of claim 1, wherein the residual ICI comes from at least one of a time-varying channel and a carrier frequency shift.

3. A method of claim 1, wherein the frequency division multiplexing signal comprises one selected from a group consisting of an orthogonal frequency division multiplexing signal, an orthogonal frequency division multiple access signal, a single-carrier frequency-domain equalization signal, a single-carrier frequency division multiplexing signal and a single-carrier frequency division multiple access signal.

4. A method of claim 1, wherein the step d) is performed by at least one of whitening on the frequency division multiplexing signal, and obtaining a channel information parameter after a computation based on at least one of the plural correlation values.

5. A method of claim 1, wherein the signal detection method is performed in the communication signal processing.

6. A method of claim 1, wherein the step d) further comprises a step of providing one of a receiver and a transmitter for performing the communication signal processing, which includes a closed loop transmission control mechanism.

7. A method of claim 1, wherein the step d) further comprises a step of providing a transmitter for performing the communication signal processing, which includes a channel sounding mechanism.

8. A method of claim 1, wherein in step c), the correlation values are ones selected from a group consisting of an estimated average power of the residual ICI and the channel noise, an estimated average power of the residual ICI, an estimated average power of the channel noise, an estimated correlation value of the residual ICI and a combination thereof.

9. A method of claim 1, wherein in step c), at least one of the correlation values is obtained by using a decision circuit's output to subtract a main signal from the frequency-domain signal and then using a result to compute a sample-average correlation.

10. A method of claim 1, wherein in step c), at least one of the correlation values is obtained from a known correlation value by using a known relationship between two of the correlation values.

11. A frequency division multiplexing communication system, having a plurality of correlation values and comprising:
 a channel for transmitting a frequency division multiplexing signal, which is transmitted by plural subcarriers and has a frequency-domain signal including a residual intercarrier interference (ICI) and a channel noise; and
 a first means for receiving the frequency-domain signal, and processing a communication signal based on the plural correlation values of a sum of the residual ICI and the channel noise, wherein the communication signal is processed through a whitening operation on the sum of the residual ICI and the channel noise at a frequency-domain.

12. A system of claim 11, having a closed loop transmission control mechanism and further comprising:
a second means, based on the closed loop transmission control mechanism, for obtaining one selected from a group consisting of the plural correlation values for the residual ICI and the channel noise, the channel information parameter, a maximum Doppler frequency shift, an average power of the residual ICI and a combination thereof, so as to adjust a method of transmitting the frequency division multiplexing signal.

13. A system of claim 12, wherein the method of transmitting the frequency division multiplexing signal comprises one selected from a group consisting of a transmission antenna array configuration, a channel coding, a modulation, a pre-coding, an adjustment of a discrete Fourier transform size, an adjustment of a cyclic prefix size and a combination thereof.

14. A system of claim 12, wherein the second means comprises a transmitter.

15. A system of claim 11, where the first means comprises a receiver.

16. A system of claim 11, wherein the communication signal is further processed through an obtainment of a channel information parameter after a computation based on at least one of the plural correlation values.

* * * * *